Nov. 6, 1951     K. D. STEWART     2,574,441
HOSE CLAMP
Filed Dec. 4, 1946
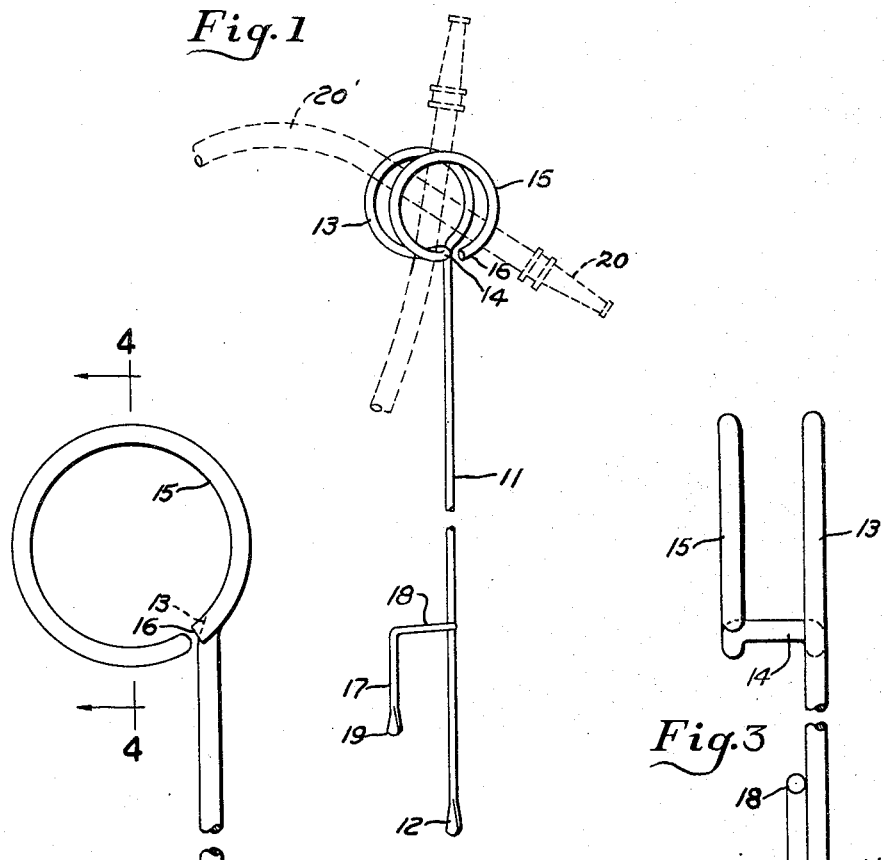
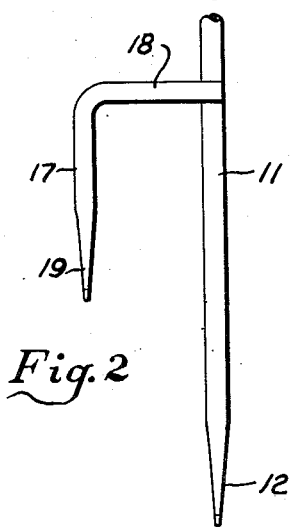
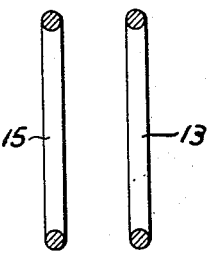
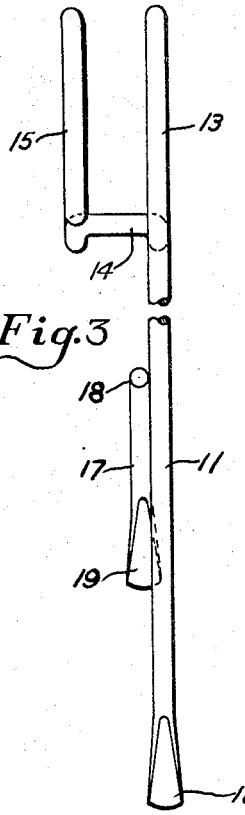
INVENTOR.
KENNETH D. STEWART.
BY *Robert A. Sloman*
ATTORNEY.

Patented Nov. 6, 1951

2,574,441

UNITED STATES PATENT OFFICE 2,574,441

HOSE CLAMP

Kenneth D. Stewart, Carleton, Mich.; Aline Stewart administratrix of said Kenneth D. Stewart, deceased Application December 4, 1946, Serial No. 714,057

1 Claim. (Cl. 248—87)

This invention relates to hose clamps, and more particularly to a hose holder having an upper looped portion for retaining the delivery end of a hose in a plurality of angular positions.

It is the object of this invention to incorporate in the hose clamp a loop portion at its upper end consisting of a pair of parallel spaced substantially circular loops for retaining the delivery end of a hose in a plurality of angularly adjusted positions.

It is the further object of this invention to provide the inner edges of the two loops equi-distant so that equilateral pressures will be exerted upon the sides of the hose inserted therein regardless of its relative angular position.

It is the further object of this invention to form the upper end of the clamp shank into a pair of equally spaced continuous loops, with a U-shaped junction between the loops limiting the angular positioning of the hose between said loops, and in some instances acting as a secondary support for the hose.

These and other objects will be seen from the following specification and claim in conjunction with the appended drawing in which:

Fig. 1 is a perspective view of the hose clamp with dotted line indications of several hose portions within its loops.

Fig. 2 is a partially broken away front elevational view of the hose clamp.

Fig. 3 is a partially broken away right end elevational view thereof; and

Fig. 4 is a section on line 4—4 of Fig. 2.

It will be understood that the above drawing illustrates merely one preferable embodiment of the invention, and that other embodiments are contemplated within the scope of the claims hereafter set out.

Referring to the drawing, the hose clamp consists of shank 11 preferably of circular cross section, which terminates in the converging flattened and pointed lower end 12.

The upper end of said shank is formed into circular loop 13. The bottom outer end of said loop projects inwardly transversely of the plane of said loop to join the U-shaped portion 14. The latter terminates in the second continuous loop 15 which lies in a plane parallel to the plane of loop 13, and has the free end portion 16.

An offset retaining spike 17 is provided remote from loops 13 and 15, with its horizontal portion 18 joined at its end to shank 11 as by welding. Said spike also has a converging flattened and pointed lower end 19 which is elevated relative to the end 12 of holder shank 11, and which is parallel thereto.

Spike 17 is adapted to be projected into the earth or turf after the end 12 of shank 11 is projected therein sufficiently. Spike 17 being spaced from shank 11, prevents turning of the hose clamp.

Referring to Fig. 1 the nozzle end of a hose is shown in dotted lines at 20 as retainingly positioned between the parallel loops 13 and 15. As distinguished from other clamps which have converging loops, said parallel loops have the advantage of permitting a plurality of angular positions of adjustment of the hose therebetween, as for instance, hose 20'.

Thus a very wide range of angular turning of the hose is permitted between the inner walls of said loops, with the latter resiliently engaging the outer walls of the hose. It will be noted that the retaining pressure of the inner walls of said loops is the same regardless of the angular position of the hose.

In the hose indication 20 it is seen that the same is further supported within the clamp by the U-shaped member 14 which interconnects loops 13 and 15. The latter being continuous, a relatively high degree of resiliency is attained for compressively holding the hose therebetween in the desired angularly adjusted position.

Furthermore it will be understood with loop 15 terminating in the free end 16 that an even greater degree of resiliency is attained than if the two loops were fully closed. In this respect loop 13 is not fully closed inasmuch as the same terminates in the U-shaped loop interconnecting member 14.

Having described my invention reference should now be had to the claim which follows for determining the scope thereof.

I claim:

A hose clamp comprising a rod with a pointed lower end, a circular loop formed at its upper end as a continuation of said rod, a transverse U-shaped portion at the end of said loop, and a second loop extending from said U-shaped portion, being a further continuation of said rod, and lying in parallel spaced relation to said first loop, said second loop having a free end rendering said second loop laterally yieldable with respect to said first loop facilitating angular adjustment of a hose between said loops.

KENNETH D. STEWART.

REFERENCES CITED

The following references are of record in the file of this patent:

UNITED STATES PATENTS

| Number | Name | Date |
|---|---|---|
| 1,058,090 | Nelson | Apr. 8, 1913 |
| 1,080,770 | Matthews | Dec. 9, 1913 |
| 1,144,495 | Nelson | June 29, 1915 |
| 1,479,532 | Coleman | Jan. 1, 1924 |
| 2,355,562 | Rombach | Aug. 8, 1944 |